United States Patent
Bressler et al.

(10) Patent No.: US 12,296,901 B2
(45) Date of Patent: May 13, 2025

(54) ELEVATED WINDOW PASSABLE AUTONOMOUS SELF-DRIVING ASSEMBLY

(71) Applicant: Southwest Research Institute, San Antonio, TX (US)

(72) Inventors: Cody Bressler, San Antonio, TX (US); Meera M. Towler, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 862 days.

(21) Appl. No.: 17/490,728

(22) Filed: Sep. 30, 2021

(65) Prior Publication Data
US 2023/0097460 A1   Mar. 30, 2023

(51) Int. Cl.
*B62D 55/065* (2006.01)
*B25J 5/00* (2006.01)
*B25J 11/00* (2006.01)
*B62D 55/075* (2006.01)

(52) U.S. Cl.
CPC .......... *B62D 55/0655* (2013.01); *B25J 5/005* (2013.01); *B25J 11/005* (2013.01); *B62D 55/075* (2013.01)

(58) Field of Classification Search
CPC ........................ B62D 55/0655; B62D 55/075
See application file for complete search history.

(56) References Cited

U.S. PATENT DOCUMENTS

| | | | | |
|---|---|---|---|---|
| 5,363,935 A | * | 11/1994 | Schempf | B62D 55/265 901/44 |
| 9,031,698 B2 | * | 5/2015 | Smith | B62D 55/06 700/262 |
| 9,586,636 B1 | * | 3/2017 | Burmeister | B62D 53/028 |
| 2019/0022848 A1 | * | 1/2019 | Akin | B62D 55/00 |

FOREIGN PATENT DOCUMENTS

| | | | | |
|---|---|---|---|---|
| CN | 101583820 A | * | 11/2009 | .......... B62D 55/065 |
| KR | 2013130405 A | * | 12/2013 | ............. A61G 5/061 |
| KR | 102317827 B1 | * | 10/2021 | ............ B25J 9/0009 |
| WO | WO-2007057904 A1 | * | 5/2007 | .............. B25J 5/005 |

* cited by examiner

*Primary Examiner* — Jacob D Knutson
(74) *Attorney, Agent, or Firm* — Verrill Dana, LLP

(57) ABSTRACT

A self-driving assembly capable of traversing an elevated window. The elevated narrow space window may be present within a confined area, for example, at a wall separating different wide space rooms. The assembly is configured to carry out unique techniques for gaining access to the window from a floor level location. Further, in addition to gaining access unique stabilizing features may be employed both in terms of physical security at an edge defining the window as well as in the form of maintaining balance through unique control over mass transfer when secured at the window.

8 Claims, 5 Drawing Sheets

ELEVATED WINDOW PASSABLE AUTONOMOUS SELF-DRIVING ASSEMBLY

BACKGROUND

Over the years, industrial applications ranging from servicing wells, exploring natural underground formations and caves, or even inspection of large man-made structures are increasingly performed by autonomous assemblies. For example, in the circumstance of well servicing, a tractor-like assembly may be used to advance imaging or interventional equipment into a well for inspection or for performing a more invasive application at a predetermined location. This is understandable given that manually accessing a downhole location, potentially several thousand feet away from an oilfield surface is not directly possible. Further, in many instances, simply dropping a vertical slickline cable or other type of conveyance line with application tools might be impractical. For example, the well may not remain vertical but rather take on a tortuous architecture or even become horizontal. Thus, traversing tortuous stretches or accessing horizontal legs is not possible without some sort of actively motive assembly. In other circumstances, things may be complicated by changing well diameter or the introduction of certain hardware obstructions.

Of course, tractoring in a well is but one example of an autonomous self-driven undertaking. Setting aside the noted potential for hardware obstructions or changing diameter, the confined area of a well generally presents a fairly reliable or consistent range of sizing within which the self-driven undertaking occurs. Things may become much more complex when the confined area is more variable. For example, consider a room of a cave, a ship hull or other facility with perhaps a connecting narrow passage between larger rooms. Once the self-driving assembly leaves the more consistent narrow passageway, movement within a larger room may be less practical for a tractor that relies on arms or other features acting against opposing passageway walls to achieve movement.

Of course, utilizing a smaller, narrow self-driving assembly instead of a tractor is practical. For this type of autonomous assembly, the ability to continue moving, perhaps in a snake-like fashion, once reaching a larger room may be reasonably attainable. Unfortunately, for these types of self-driving assemblies, the ability to perform applications once in the room is fairly limited. That is, anything beyond data collection or visual inspection may be difficult because these types of assemblies lack the ability to self-brace or anchor, particularly within large rooms. So, for example, power washing the room with the narrow autonomous self-driving assembly once the assembly reaches the room is probably not a practical undertaking. Imagine an unbraced and unstable water hose in a room turned on full blast. Thus, apart from the assembly collecting data to tell us how badly the room is in need of a power wash, the ability to take any further action is this regard is simply not there.

Even more challenging than confined areas with narrow passageways running between rooms is the fact that the narrow space may not be an elongated passageway or channel through which an autonomous self-driving assembly might drive. In some circumstances the narrow space may be less of a passageway and more of an elevated window. So, consider the scenario where an autonomous self-driving assembly has reached a room, perhaps after travelling through an elongated narrow passageway or traversing a narrow doorway or window at ground level. Once in the room, there may be a desire to direct the self-driving assembly to reach an adjacent room or other wide space for inspection or to perform an application. However, if the route to the adjacent room or other wide space consists of an elevated window, this may be an impractical undertaking.

Unlike a window or doorway that presents an opening at ground level where the self-driving assembly finds itself positioned at a floor of the room, an elevated window presents a unique challenge. Specifically, how an autonomous self-driving assembly might reach an elevated window from ground level for sake of making it to an adjacent room may be an impractical undertaking.

Presently, conventional autonomous self-driving assemblies generally lack capacity to reach such a window. Even where gripping features are applied to the mode of conveyance, for example, to allow for some degree of interfacing and perhaps attaining some level of wall climb, the ability to actually reach or interface with the window remains lacking as does the ability to make it to the adjacent room through the window. In fact, depending on how the assembly reached the room, it may not be uncommon for the assembly to find itself permanently stuck in this wider space room.

SUMMARY

An autonomous self-driving assembly which is navigable through an elevated window is disclosed. The assembly includes a linear rail mechanism to govern balance for the assembly during the passing through the window. A first or leading tread unit is coupled to the linear rail mechanism to initiate the passing through the window with a second or trailing tread unit also coupled to the rail mechanism. The trailing tread unit is slidable toward the first tread unit along the rail mechanism. Further, at least one securing extension is provided at one of the tread units. The extension is configured to either engage the units together and/or engage with an edge defining the window so as to help facilitate the passing of the assembly through the window.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain ship hull applications. For example, a self-driving assembly is illustrated within a room that may be referred to as a wide space of a confined area. At one location, the room is defined by a wall with an elevated window or hatchway. Thus, in order to reach an adjacent room of the ship hull, the self-driving assembly is presented with the challenge of navigating or passing through the narrow space window. The assembly may be configured for performing any number of applications within the adjacent room, examples of which are detailed herein. Regardless, so long as the assembly is navigable through the window with the aid of a balanced technique of tread units with a rail and at least one securing extension, appreciable benefit may be realized.

Figure 1:
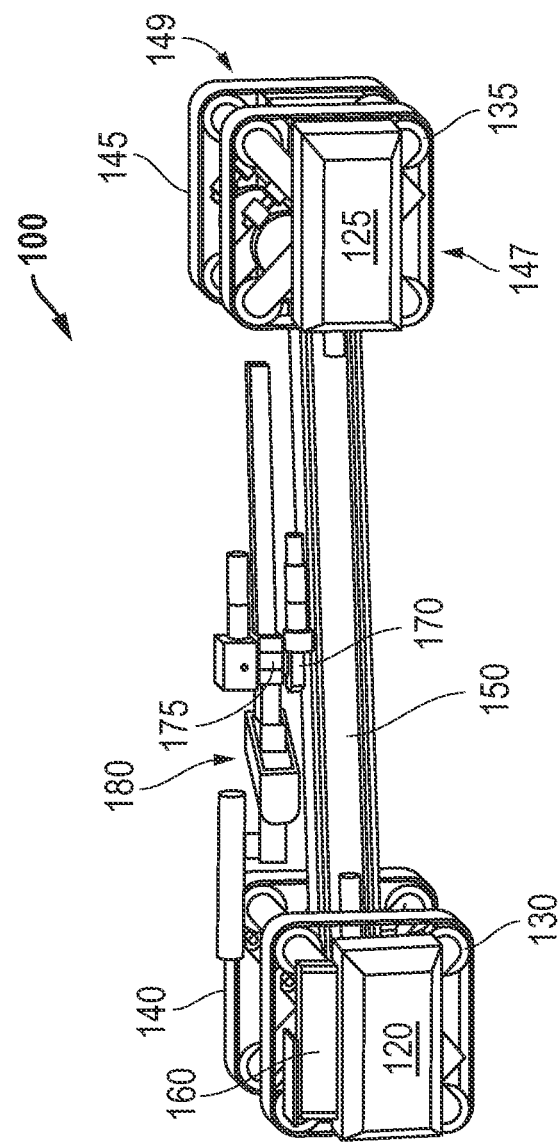
FIG. 1 is a side perspective view of an embodiment of an elevated window passable autonomous self-driving assembly.

Referring now to FIG. 1, a side perspective view of an embodiment of an elevated window passable autonomous self-driving assembly 100 is shown. The assembly 100 is an advanced mobility crawler that includes tread units 120, 125 with a linear rail 150 running therebetween. The result is a gantry-like appearance with the rail 150 used to accommodate an application tool 180. In the embodiment shown, the tool 180 is made up of an arm outfitted with a spray device to direct a pressure washing application. However, as discussed below, the tool 180 may be any number of different devices configured for directing an application in the environment of a confined area 201 (e.g. a ship hull as shown in FIG. 2).

In the embodiment of FIG. 1, the tool 180 is shown roughly at a parallel orientation relative the rail 150. However, notice that this may be due to a pivot mechanism 175 which allows the tool 180 to take on a desired low profile orientation for driving or an extended orientation ultimately performing the application at hand as detailed below. Regardless, the pivot 175 and the entire tool 180 are supported by a slidable base 170. Thus, when time comes to perform an application, the tool 180 may be oriented as desired relative the rail 150 and moved along the rail 150 without requirement of moving the entire assembly 100. This may be advantageous in circumstances where the assembly 100 is immobile and braced for the performance of an application.

As illustrated, the tread units 120, 125 include treads 140, 145 that are directed by conventional rollers 130, 135 located interior to the treads 140, 145. The units 120, 125 are fairly compact, perhaps less than a foot or two wide from one side to the other. Similarly, the height of the assembly, including the tool 180 may be less than about a foot or two. Thus, the profile of the entire assembly 100 may be kept to a minimum. For example, the assembly 100 may be of a profile sufficiently small enough to advance through a narrow space window 250 or entryway as illustrated in FIG. 2.

Figure 2:
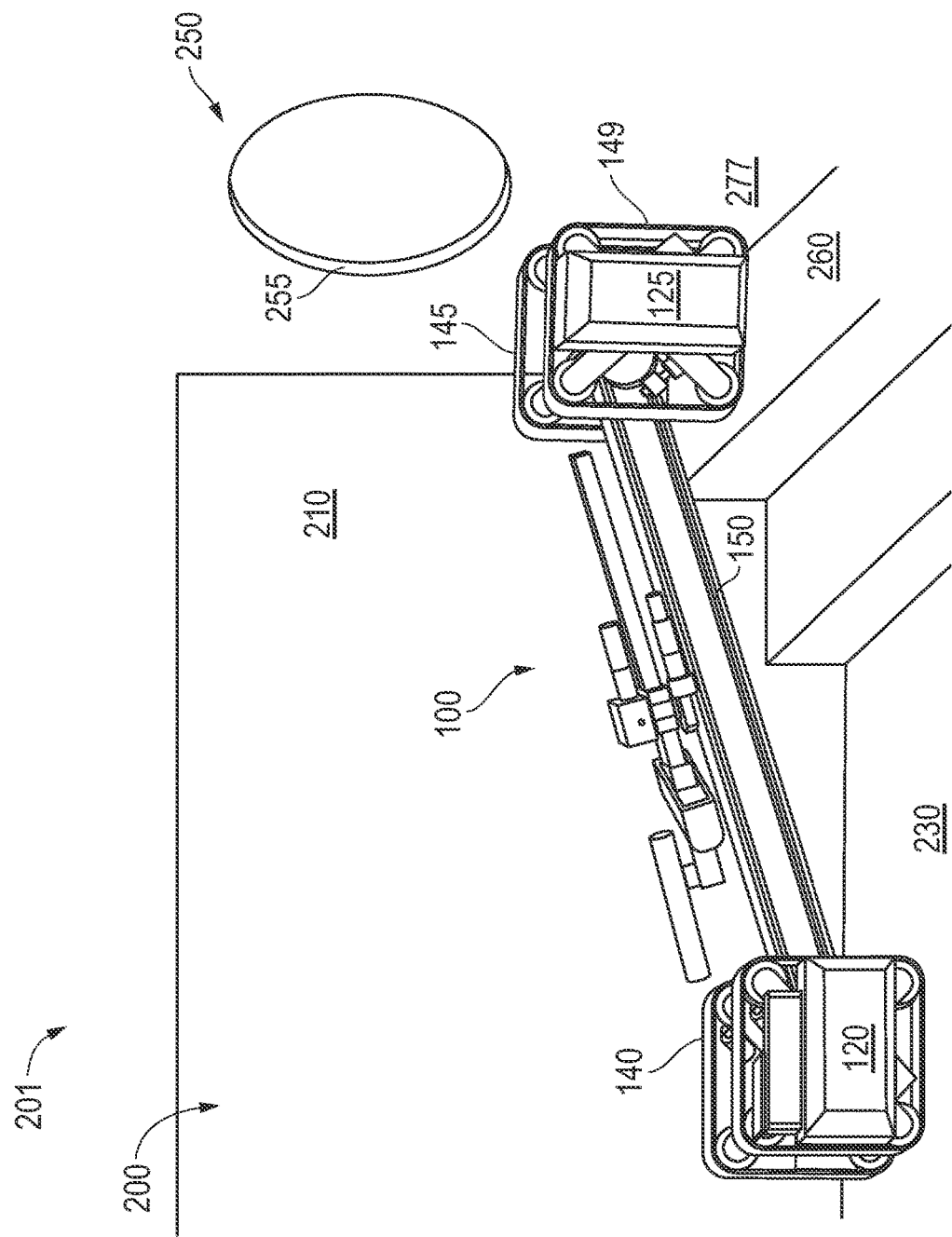
FIG. 2 is a perspective view of the assembly of FIG. 1 within a first wide space room of a confined area also having a narrow space window leading to an adjacent wide space room.

With added reference to FIG. 2, one of the tread units 125 may be referred to as a leading unit, for example, in relation to the assembly 100 advancing toward a wall 277 having the above noted narrow space window 250. Both tread units 120, 125 are pivotal in relation to the rail 150. The front or toe end 149 of the leading unit 125 may interface the wall 277 as illustrated in FIG. 2 as part of reaching the window 250. Of course, given the pivotal relation to the linear axis of the rail 150, any edge of the tread 145 has the capability of serving as the toe end 149 to interface the wall 277 of FIG. 2. For example, as illustrated in FIG. 2, the leading unit 125 has rotated in facilitating advancement of the assembly 100 over a stair obstacle 260. Nevertheless, a toe end 149 thereof has reached interface with the wall 277.

Referring now more specifically to FIG. 2, a perspective view of the assembly 100 of FIG. 1 is shown within a first wide space room 200 of a confined area 201. Of note, is the narrow space window 250 leading to an adjacent wide space room 350 (see FIGS. 3A-3D). Self-driving assemblies face unique challenges when navigating in a confined area 201 that includes both wide spaces 200 and narrow spaces 250. This is in part due to the wide variability in space dimensions depending on the location of the assembly 100 in the area 201. However, in the illustrated circumstance, the challenge goes beyond just variability in space dimensions. Rather, the added complexity of the narrow space window 250 being elevated adds to the challenge. That is, it is not just that the self-driving assembly 100 may need to be configured for navigating in both a wide space 200 and a narrow space 250 or that it may face obstacles (e.g. stairs 260). On top of this, getting the assembly 100 from one wide space room 200 to another 350 requires passage through an elevated window 250 (see FIGS. 3A-3D). Nevertheless, the self-driving assembly 100 embodiments herein are uniquely configured and employ unique techniques for achieving this passage.

Of course, the self-driving assembly 100 is of a size that is well suited for window passage. In one embodiment, the window 250 may be about 2 feet in diameter with the assembly 100 of a profile that is substantially below about two feet, perhaps no more than a foot in vertical height or horizontal width. That is, when it comes to advancing or driving, it may be that utilizing a longer but narrow assembly 100 such as this would be sufficient for either type of space (e.g. the wide 200 or narrow 250). That is, as long as the assembly 100 is of a profile that allows movement through a narrow window 250, it may inherently also be of a profile that allows movement within the larger wide space room 200. Indeed, such is the case with the depicted assembly.

Continuing with reference to FIG. 2, the wide space 200 depicted includes a sidewall 210, a floor 230 and a backwall 277. Once more, obstacles such as stairs 260 may be present as well as the indicated window 250. Of course, this is just an exemplary wide space 200 and overall confined area 201. Any number of different types of confined area 201 architectures may be presented that include an elevated narrow space window 250 to the assembly 100.

In the embodiment of FIG. 2, the self-driving assembly 100 is headed along a floor 230 toward the wall 277 and window 250 as noted. When presented with the obstacle stairs 260, the leading unit 125 rotates or pivots about an axis that is perpendicular to the rail 150, as it rolls up the stairs 260. Of course, this is not required. Indeed, the tread 145 may carry the leading unit 125 up the stairs in absence of the depicted rotation. Regardless, note that in contrast to the embodiment of FIG. 1, the rail 150 and units 120, 125 both take on a new angular orientation with respect to one another as the assembly 100 inclines upward from the bottom to the top of the stairs 260.

Upon reaching the back wall 277, the toe side 149 of the tread 145 interfaces directly with the wall 277 as noted above. Further, the toe side 149 may work in cooperation with the tread 140 of the lagging unit 120 to continue advancement and drive the leading unit 125 up the wall 277 in order to reach the window 250. In one embodiment, the treads 140, 145 are equipped with a gripping enhancement as an aid to traversing an obstacle such as the depicted stairs 260 and wall 277. For example, magnetic or suction features may be employed to aid in climbing the stairs 260 and up the wall 277.

Figure 3A:
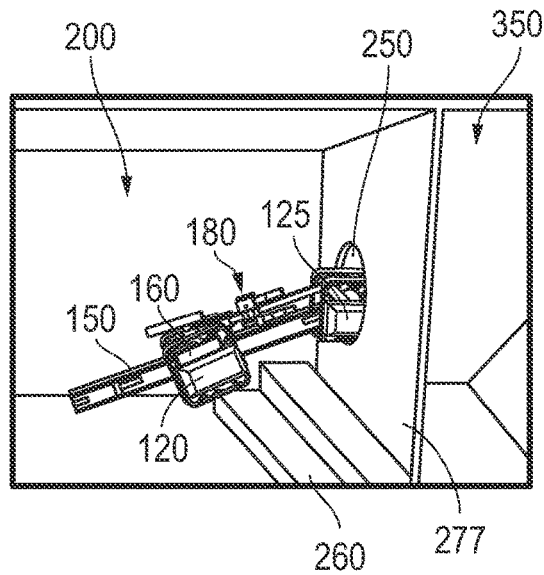
FIG. 3A is a side perspective view of the assembly of FIG. 2 traversing obstacle stairs and reaching the narrow space window with a first tread unit thereof.

Referring now to FIGS. 3A-3D, the assembly 100 is shown passing through the raised window 250 from one room 200 to another 350. Specifically, FIG. 3A is a side perspective view of the assembly 100 of FIG. 2 traversing obstacle stairs 260 and reaching the narrow space window 250 with a first or leading tread unit 125 thereof. As noted above, the leading tread unit 125 may drive up a portion of the wall 277 in order to reach the elevated window 250. Further, due to sizing and profile as described above, the assembly 100 is small enough to begin passage through the window 250.

Figure 3B:
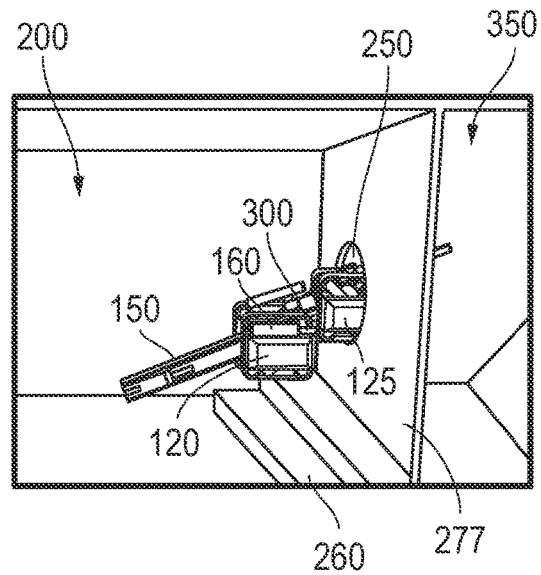
FIG. 3B is a side perspective view of the assembly of FIG. 3A with a second tread unit advanced along a rail of the assembly with a securing extension linking to the first tread unit.

With added reference to FIG. 2, reaching the window 250 with the leading unit 125 making it through as illustrated in FIG. 3A may be facilitated by features and techniques in addition to driving of the unit 125 up the wall 277. For example, notice that the lagging unit 120 includes a clamp securing extension 160. As shown in FIG. 3B, this extension 160 may be utilized to extend an arm 300 into engagement with the leading unit 125 as an aid to progressing the assembly 100 through the window 250. Similarly, a securing extension may also be incorporated into the leading unit 125. So, for example, this leading unit extension may be utilized to secure the leading unit 125 to an edge 255 defining the window 250 (again, see FIG. 2). Thus, with the leading unit 125 driven up the wall 277 and to the window 250, the extension of the leading unit 125 may engage the edge 255 and in cooperation with the leading unit treads 145, begin to pull the leading unit 125 through the window 250.

Continuing with reference to FIG. 3A, it is also apparent that the lagging unit 120 is no longer positioned near the lagging end of the rail 150. Indeed, each unit 120, 125 and the rail 150 are slidable with respect to one another. As illustrated, the lagging unit 120 has initiated a slide up the rail 150 and begins to travers the obstacle stairs 260 just as the leading unit 125 has already done. Just as with the leading unit 125, the lagging unit 120 is also in a pivotal relation with the same rail 150 that it is sliding up. Thus, the unit 120 may tumble end over end or take on any such orientation as the treads 140 continue the drive of the unit up the stairs 260.

Referring now more specifically to FIG. 3B, with added reference to FIG. 2, a side perspective view of the assembly of FIG. 3A is shown with the second lagging tread unit 120 reaching the first leading tread unit 125 at the window. At this point, two different techniques are employed in stabilizing the assembly 100 in the illustrated position. First, as suggested above, the securing extensions 160 of the lagging unit 120 are engaging the leading unit 125. In particular, arms 300 are engaged with the tread 145 of the leading unit 125 once the lagging unit 120 has driven up the rail 150 to reach the leading unit 125. This same type of security may be achieved with additional extensions of the leading unit 125 engaging with the window edge 255 as described above.

In addition to this type of coupling physical security and with added reference to FIG. 2, a second technique may also be employed in stabilizing the assembly 100 as illustrated in FIG. 3B. Namely, a balancing technique may be employed. That is, recall that the rail 150 and units 120, 125 are slidable relative one another. Thus, just as the lagging unit 120 has driven up the rail 150, so too might the rail 150 be driven up the coupled together units 120, 125. Indeed, the rail 150 may begin ascension relative the stabilized leading unit 125 at the window 250 even before the lagging unit 120 has reached the leading unit 125 as depicted. This is all a matter of weight and distribution. That is, a manner of controlled mass transfer is employed that keeps the center of gravity near the sill or edge 255 of the window 250 throughout this movement. Thus, the physical security employed by securing extensions 160 is not overcome by an out of balance assembly 100 at the window 250.

Figure 3C:
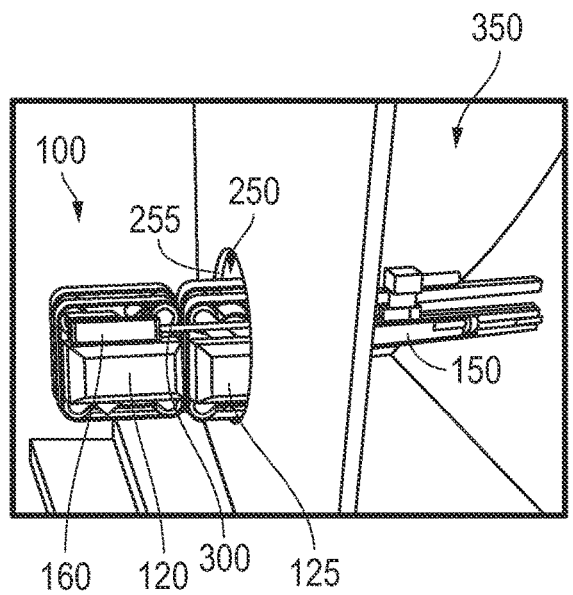
FIG. 3C is a side perspective view of the assembly of FIG. 3B with the rail substantially advanced through the window and the securing extension linking to a defining edge thereof.

Referring now to FIG. 3C, with added reference to FIG. 2, a side perspective view of the assembly 100 of FIG. 3B is illustrated with the rail 150 substantially advanced through the window 250. That is, the rail 150 may continue to advance through the window 250 as illustrated in FIG. 3B until the lagging unit 120 is brought into horizontal alignment with the leading unit 125. This may involve the upward movement of the securing extension arms 300 along with the lagging unit 120 dictated by the controlled mass transfer noted above as the rail 150 reaches further into the adjacent room 350 and away from the window 250.

Continuing with reference to FIG. 3C, the assembly 100 should be thought of as roughly balanced at the window edge 255. With this in mind, note the changed position of the arms 300. That is, with the assembly 100 roughly balanced, the arms 300 may move from engagement with the leading unit 125 to engagement with the edge 255 or through the window 250 to the opposite side of the wall 277. This movement may be aided by the condition of the assembly 100 as roughly balanced in place. The new position of the arms 300 may further advance the assembly 100 through the window 250 as described below.

Figure 3D:
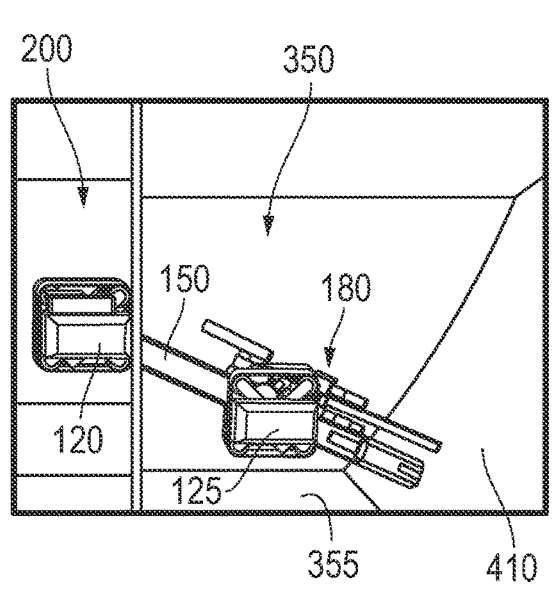
FIG. 3D is a side perspective view of the assembly of FIG. 3C with the first tread unit advancing along the rail into the adjacent wide space room.

Referring now to FIG. 3D, a side perspective view of the assembly of FIG. 3C is illustrated with the first leading tread unit 125 now advancing along the rail 250 into the adjacent wide space room 350. At this point, the controlled mass transfer which had maintained assembly 100 balance at the window's edge 255 now has intentionally shifted away from this balanced location. It is of note that until this intentional shift, the ability of the assembly 100 to reverse course back into the initial wide space room 200 was maintained. However, upon making the determination to enter the adjacent room 350, a swing of balance into the room 350 by movement of the rail 150 to the floor 355 or sidewall 410 to provide a support point followed by the moving of the leading unit 125 down the rail 150 may take place. This may be done, for example, to ultimately perform an application in the room 350 with a tool 180 accommodated by the assembly 100. Regardless, by relying on the controlled mass transfer approach, only a minimal amount of force is required to deliver the assembly 100 into the room 350.

Figure 4A:
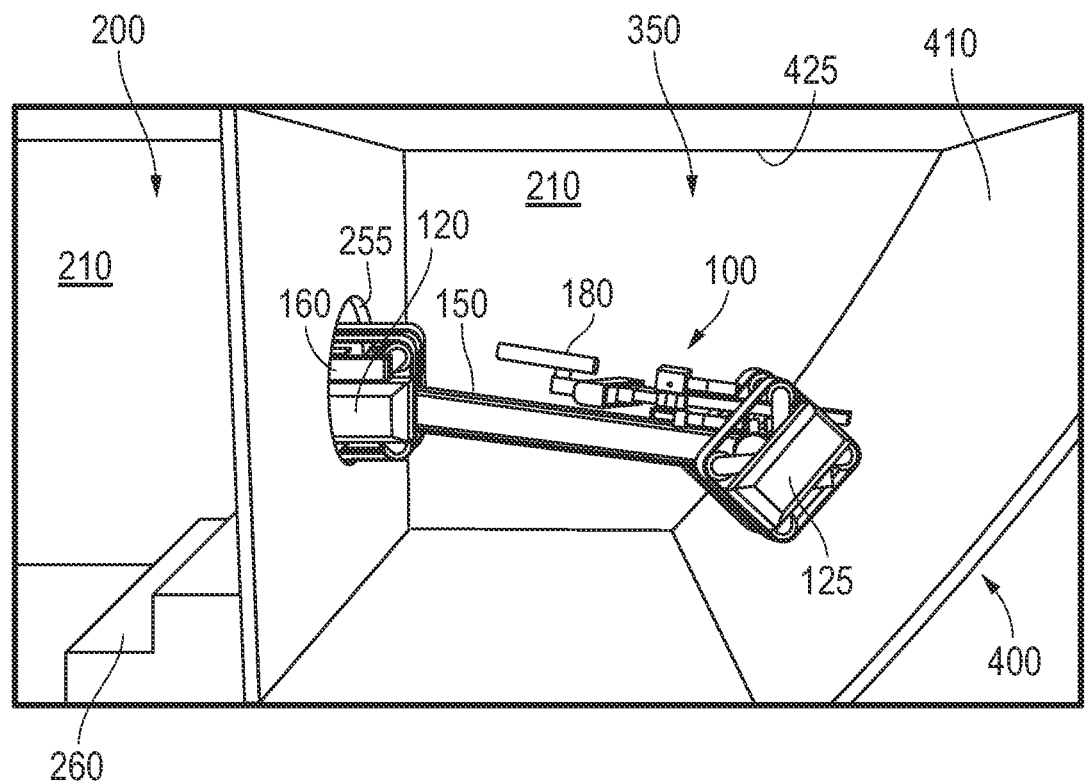
FIG. 4A is a side perspective view of the assembly of FIG. 3D with the securing extension detaching from the window edge and the assembly orienting itself in the adjacent room to perform an application therein.
Figure 4B:
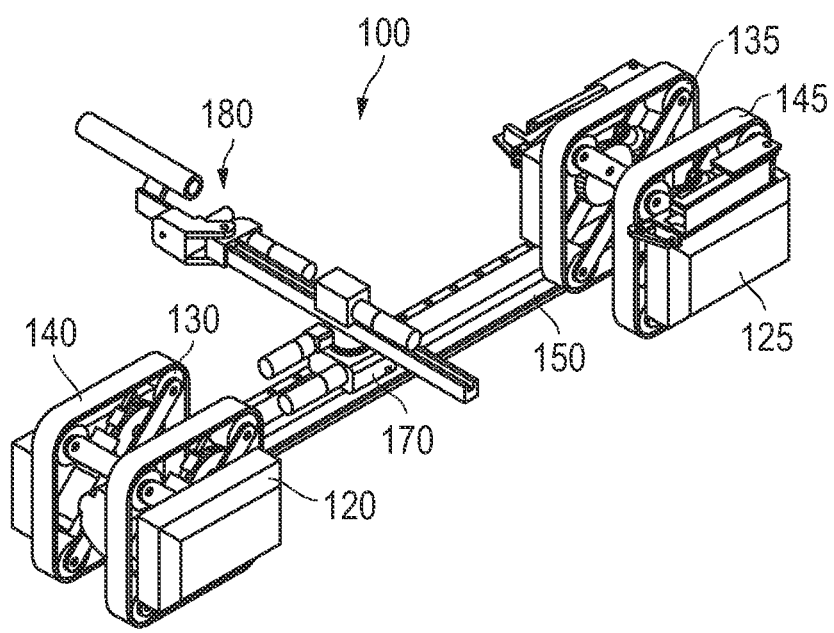
FIG. 4B is a perspective view of the assembly with an application tool extended away from the rail to perform the application therewith.

Referring now to FIG. 4A, a side perspective view of the assembly 100 of FIG. 3D is illustrated with the securing extension 160 detaching from the window edge 255 and the assembly 100 orienting itself in the adjacent room 350. The lagging unit 120 may continue to advance the assembly 100 fully through the window 250 as the leading unit 125 also helps to orient for the application. Thus, as illustrated in FIG. 4B, the application tool 180 may extend from the parallel orientation with the rail 150 and into an orientation best suited for the application. That is, with the assembly 100 now driven into place within the room 350, the narrowed profile facilitating passage through the window 250 is no longer of primary concern. Rather, orienting the tool 180 as needed for the application may now be of primary concern.

In the embodiment shown, the application at hand is a power washing application to be directed at the wall 210 which is also shared with the initial wide space 200. The application may subject the assembly 100 to a force of up to 100 lbs, though likely only about 25 lbs. may result. In one embodiment, the assembly 100 reaches the depicted location pulling a fluid line from a location external to the confined area of the ship 400. Thus, the tool 180 is provided with a supply of pressure washing fluid for the application. Of course, any number of applications may be carried out in this manner by such an assembly 100. Milling or drilling, media blasting, backfilling or any number of other applications that might be considered "load-based" or otherwise, such as mere visual inspection or other data gathering applications. Once more, the types of confined areas are not limited to ships or even man-made structures. For example, the assembly 100 may be used to address issues within large wind turbines, nuclear facilities, manmade structures in war zones or even natural cavernous areas. Regardless, when faced with the prospect of moving between rooms 200, 350 by way of an elevated window, achieving passage with the self-driven assembly 100 and techniques detailed herein is now rendered possible.

Figure 5:
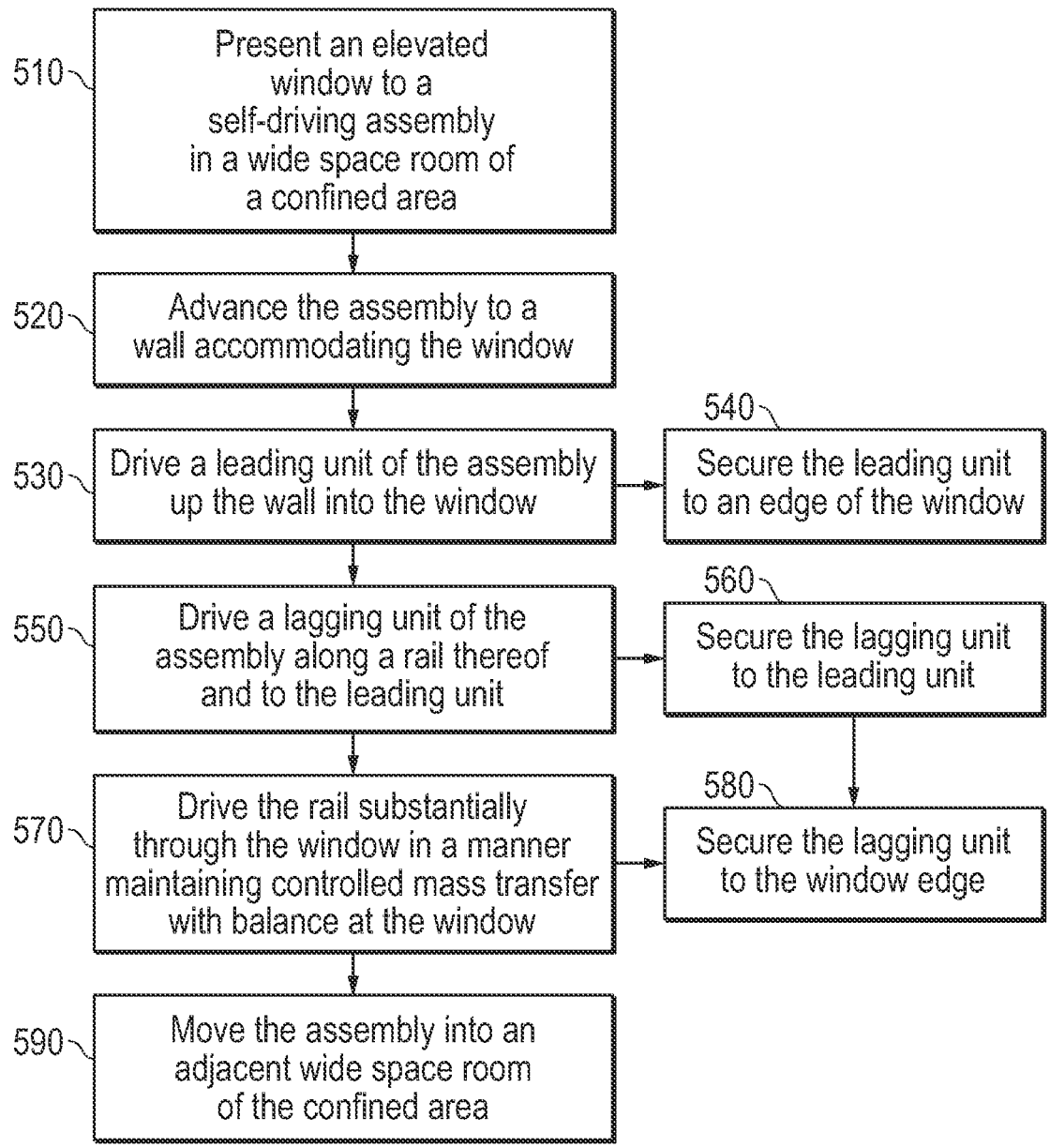
FIG. 5 is a flow-chart summarizing an embodiment of utilizing an autonomous self-driving assembly for passage through a narrow space window between a first wide space room and an adjacent wide space room for performing an application in the latter.

Referring now to FIG. 5, a flow-chart is shown summarizing an embodiment of utilizing an autonomous self-driving assembly for passage through a narrow space window between a first wide space room and an adjacent wide space room. This may be done in order to perform an application in the adjacent wide space room with the assembly. More specifically, upon being presented in one wide space room of a confined area as indicated at 510, the assembly may be advanced to a wall accommodating the window (see 520). As noted at 530, the assembly may be driven up the wall too the window with a leading unit thereof. In one embodiment, this leading unit is secured to an edge of the window as indicated at 540. Further, a lagging unit of the assembly may be driven along a rail of the assembly toward the leading unit at the window (see 550). The lagging unit may then be secured to the in place leading unit.

With the assembly now largely in position at the window, the rail itself may be substantially driven through the window in a manner maintaining controlled mass transfer with balance at the window (see 570). In cooperation with this controlled and balanced mass transfer, the lagging unit may re-secure itself at the window edge as noted at 580. Thus, as noted at 590 the assembly may continue moving through the window to an adjacent wide space room of the confined area. This may involve stabilizing the assembly by interfacing a floor of the adjacent room with the rail and disengaging of the leading unit from the window for advancement along the rail into the next room, followed by completed delivery of the lagging unit and assembly into the adjacent room.

Embodiments described above provide self-driving autonomous assemblies that are able to navigate the unique challenge of a raised window in order to move from one room to another by way of the window. This is achieved in a manner of enhanced, controlled stability and mass transfer for sake of improved balance throughout the passage through the window.

The preceding description has been presented with reference to presently preferred embodiments. Persons skilled in the art and technology to which these embodiments pertain will appreciate that alterations and changes in the described structures and methods of operation may be practiced without meaningfully departing from the principle and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A self-driving assembly for passing through a narrow space elevated window, the assembly comprising:
   a linear rail to govern a center of gravity for the assembly during the passing through the window;
   a leading tread unit coupled to the rail to initiate the passing;
   a lagging tread unit slidably coupled to the rail to facilitate movement thereof along the rail away from an end thereof and toward the leading tread unit; and
   at least one securing extension of at least one of the units to engage one of the other unit and an edge defining the window to facilitate the passing of the assembly therethrough with cooperation of controlled mass transfer from the governed center of gravity by the rail.

2. The self-driving assembly of claim 1 wherein the securing extension is a securing extension of the lagging unit for both engaging the units together and engaging with an edge defining the window.

3. The self-driving assembly of claim 1 wherein the tread units comprise treads driven by rollers to facilitate the passing of the assembly.

4. The self-driving assembly of claim 3 wherein the treads of at least the leading unit comprise gripping enhancement to facilitate driving of the leading unit from a floor and up a wall defining the window.

5. The self-driving assembly of claim 4 wherein the gripping enhancement is selected from a group consisting of magnetic features and suction features.

6. The self-driving assembly of claim 1 further comprising an application tool coupled to the rail.

7. The self-driving assembly of claim 6 wherein the application tool is coupled to the rail at a pivot location of a slidable base.

8. The self-driving assembly of claim 6 wherein the application tool is one of a non-load based data gathering tool and a load based tool selected from a group consisting of a pressure wash tool, a milling tool, a drilling tool and a media blasting tool.

* * * * *